US010574240B2

(12) United States Patent
Jenkins et al.

(10) Patent No.: US 10,574,240 B2
(45) Date of Patent: Feb. 25, 2020

(54) RING OSCILLATOR STRUCTURES TO DETERMINE LOCAL VOLTAGE VALUE

(71) Applicant: International Business Machines Corporation, Armonk, NY (US)

(72) Inventors: Keith A. Jenkins, Sleepy Hollow, NY (US); Peilin Song, Lagrangeville, NY (US); James H. Stathis, Poughquag, NY (US); Franco Stellari, Waldwick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 15/445,587

(22) Filed: Feb. 28, 2017

(65) Prior Publication Data
US 2018/0248555 A1 Aug. 30, 2018

(51) Int. Cl.
*H03L 1/00* (2006.01)
*H03K 3/03* (2006.01)
(Continued)

(52) U.S. Cl.
CPC ............ *H03L 1/00* (2013.01); *G01R 31/2824* (2013.01); *G01R 31/2851* (2013.01); *H03B 1/00* (2013.01);
(Continued)

(58) Field of Classification Search
CPC ... H03B 5/30; H03B 5/12; H03B 5/36; H03B 1/00; H03B 5/1215; H01L 2924/00;
(Continued)

(56) References Cited

U.S. PATENT DOCUMENTS 5,677,650 A   10/1997  Kwasniewski et al.
7,449,966 B2  11/2008  Burton et al.
(Continued)

FOREIGN PATENT DOCUMENTS

JP    2009071160 A    4/2009
JP    2016111563 A    6/2016

OTHER PUBLICATIONS

Anonymous, "Transient Response Characterization of Semiconductor Wearout Characteristics," (Oct. 5, 2016), 4 pages.
(Continued)

*Primary Examiner* — Arnold M Kinkead
(74) *Attorney, Agent, or Firm* — Intelletek Law Group, PLLC; Gabriel Daniel, Esq.

(57) ABSTRACT

An electronic apparatus for testing an integrated circuit (IC) that includes a ring oscillator is provided. The apparatus configures the ring oscillator to produce oscillation at a first frequency and configures the ring oscillator to produce oscillation at a second frequency. The apparatus then compares the second frequency with an integer multiple of the first frequency to determine a resistive voltage drop between a voltage applied to the IC and a local voltage at the ring oscillator. The ring oscillator has a chain of inverting elements forming a long ring and a short ring. The ring oscillator also has an oscillation selection circuit that is configured to disable the short ring so that the ring oscillator produces a fundamental oscillation based on signal propagation through the long ring and enable the short ring so that the ring oscillator produces a harmonic oscillation based on a signal propagation through the short ring and the long ring.

18 Claims, 9 Drawing Sheets

(51) Int. Cl.
| | |
|---|---|
| *H03B 5/12* | (2006.01) |
| *H04L 9/32* | (2006.01) |
| *H03B 5/30* | (2006.01) |
| *H03B 5/36* | (2006.01) |
| *H03B 1/00* | (2006.01) |
| *G01R 31/28* | (2006.01) |

(52) U.S. Cl.
 CPC ............. *H03B 5/12* (2013.01); *H03B 5/1215* (2013.01); *H03B 5/30* (2013.01); *H03B 5/36* (2013.01); *H03K 3/0315* (2013.01); *H04L 9/3278* (2013.01)

(58) Field of Classification Search
 CPC ..... H01L 2924/1461; H01L 2924/0002; H01L 2224/49175; H03K 3/0315; H03K 3/84; H03K 5/135; H03K 17/693; H04L 9/3278; G01R 31/2851; G01R 31/2824
 USPC ......... 331/44, 57, 2, 46; 324/73.1, 763, 765, 324/750; 714/724, 742
 See application file for complete search history.

(56) References Cited

U.S. PATENT DOCUMENTS

| | | | |
|---|---|---|---|
| 7,531,836 | B2 | 5/2009 | Liu et al. |
| 7,548,823 | B2 | 6/2009 | Singh et al. |
| 8,020,138 | B2 | 9/2011 | Balch et al. |
| 8,264,287 | B2 | 9/2012 | Maheshwari |
| 8,368,385 | B2 | 2/2013 | Barton et al. |
| 8,419,274 | B2 | 4/2013 | Chen et al. |
| 9,000,850 | B2 | 4/2015 | Chuang et al. |
| 9,018,987 | B1 | 4/2015 | Lahiri |
| 2010/0253382 | A1* | 10/2010 | Wang ................ G01R 31/2884 324/762.09 |
| 2017/0170721 | A9 | 6/2017 | Kim et al. |

OTHER PUBLICATIONS

Dua et al., "Resistorless on-die high voltage power supply noise measurement," 27th IEEE International System-on-Chip Conference (SOCC) (2014), pp. 390-392.

\* cited by examiner

RING OSCILLATOR STRUCTURES TO DETERMINE LOCAL VOLTAGE VALUE

STATEMENT REGARDING FEDERALLY SPONSORED RESEARCH OR DEVELOPMENT

This invention was made with Government support under Contract No. HR0011-16-C-0040 with Defense Advanced Research Projects Agency (DARPA). The Government has certain rights in this invention.

BACKGROUND

Technical Field

The present disclosure generally relates to the manufacturing and testing of integrated circuits (ICs).

Description of the Related Art

A ring oscillator is a device that includes an odd number of inverting elements (e.g., inverters, NAND gates, NOR gates, etc.) in a ring, whose output oscillates between two voltage levels. The inverting elements are connected as a chain. Signals propagate through the chain of inverting elements and the output of the last inverting element is fed back into the first. Many wafers include a ring oscillator as part of the scribe line test structures. They are used during wafer testing to measure the effects of manufacturing process variations. Ring oscillators can also be used to measure the effects of voltage and temperature on an IC.

SUMMARY

Some embodiments of the disclosure provide a method for testing an integrated circuit (IC) that includes a ring oscillator. The method configures the ring oscillator to produce oscillation at a first frequency and configures the ring oscillator to produce oscillation at a second frequency. The method then compares the second frequency with an integer multiple of the first frequency to determine a resistive voltage drop between a voltage applied to the IC and a local voltage at the ring oscillator.

In some embodiments, the ring oscillator has a chain of inverting elements forming a long ring and a short ring. The ring oscillator also has an oscillation selection circuit that is configurable to disable the short ring so that the ring oscillator produces a fundamental oscillation based on signal propagation through the long ring and enables the short ring so that the ring oscillator produces a harmonic oscillation based on signal propagation through the short ring and the long ring. The IC has a frequency output pad connected to an output of the ring oscillator.

In some embodiments, the IC includes multiple ring oscillators. Each ring oscillator is configurable to produce oscillations at one of a first frequency and a second frequency. The IC has an input pad that is configured to provide a control signal to the plurality of ring oscillators to select one of the first frequency and the second frequency. The IC also includes an output pad that is configured to monitor oscillations of the plurality of ring oscillators.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Ring oscillators are often built into integrated circuits (ICs) to characterize the performance and age-dependence of the IC. However, within such an IC, the power connections to a ring oscillator may not be the same as the power connections to functional circuits of the IC. Specifically, the wire resistance of the power connections to the ring oscillator may be greater than those to the functional circuits. The wire resistance may cause the local voltage at the ring oscillator to be lowered by a resistive drop (or IR drop) than the applied voltage of the IC. Consequently, the ring oscillator would not be able to represent the true performance of the IC at the applied voltage. This problem is particularly acute in reliability testing, where high stress voltages lead to significantly higher current and larger resistive drop.

One approach to measure the local voltages of ring oscillators is to add a voltage-monitoring tap to each ring oscillator. To observe the local voltage of each ring oscillator using this approach would require a probe pad for each ring oscillator. Observing the local voltages of multiple ring oscillators in the IC would require multiple probe pads.

Some embodiments of the disclosure provide a ring oscillator whose local voltage can be determined by measuring the frequencies of its oscillation. Specifically, the ring oscillator can be configured to produce a fundamental oscillation at a first frequency and also be configured to produce a harmonic oscillation at a second frequency. The local voltage of the ring oscillator can be determined based on a comparison between the first frequency and the second frequency. The oscillations of the ring oscillator can be monitored from a frequency-monitoring probe pad of the IC. The same frequency probe pad can be used to monitor the oscillations of multiple ring oscillators in the IC and to determine the local voltages of the multiple ring oscillators.

Figure 1:
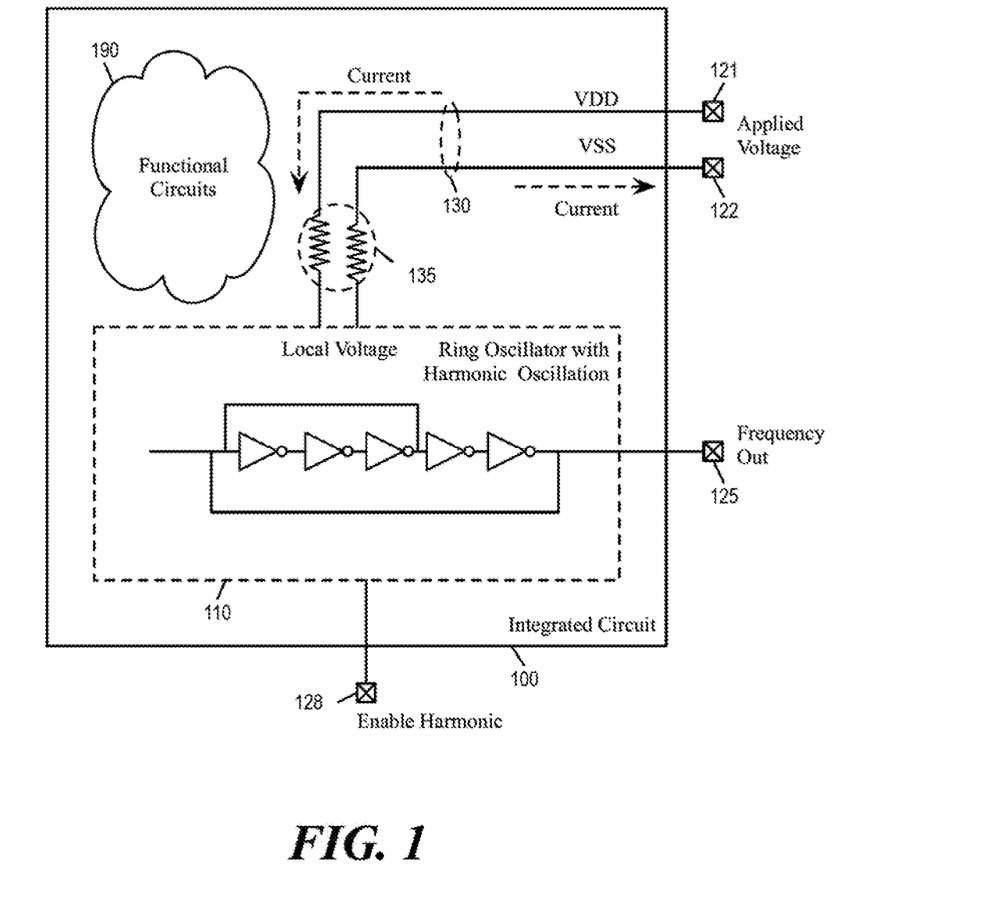
FIG. 1 illustrates an integrated circuit (IC) having a ring oscillator, consistent with an exemplary embodiment.

FIG. 1 illustrates an IC 100 having a ring oscillator 110, consistent with an exemplary embodiment. The IC includes functional circuits 190 as well as the ring oscillator 110. The ring oscillator 110 receives power supplies (VDD and VSS) from power pads 121 and 122 of the IC 100 through power connections 130. The power connections 130 is assumed to have wire resistance 135. As the ring oscillator 110 oscillates, current flow through the wire resistance 135 and causes a voltage drop, from the applied voltage at the power pads 121-122, to the local voltage across the ring oscillator 110.

The ring oscillator has a ring of inverting elements. The output of one of the inverting elements serves as the output of the ring oscillator, which is also a frequency-monitoring tap. The output of the ring oscillator is connected to an output pad 125 ("frequency_out") of the IC so that the frequency of the oscillation of the ring oscillator can be measured. In some instances the output of the ring oscillator may be first connected to a counter/divider that is used to reduce its frequency to a more manageable value. Output buffers may also be used to drive the signal at the output pad 125.

The ring oscillator can be configured to produce a fundamental oscillation and/or a harmonic oscillation. This is controlled by an enable harmonic signal provided by an input pad 128 ("enable_harmonic"). By using the "enable_harmonic" input pad to select either the fundamental oscillation or the harmonic oscillation, an IC tester may measure the frequencies of the ring oscillator 110 in these two oscillation conditions. The measured frequencies, along with the measured current absorbed by the ring oscillator through power pads 121 and 122, are in turn used to determine the wire resistance value and the local voltage value without having to directly probe the local voltage of the ring oscillator. The computation of local voltage value and wire resistance value will be described by reference to FIGS. 3 and 4 below.

In some embodiments, the ring oscillator is used as an on-chip voltage sensor. For example, instead of being powered by a primary pad, the ring oscillator could be embedded in the power domain of a computing unit such as a graphical processor or a memory array. Then the ring oscillator can be operated to measure the local voltage of that computing unit if the current through that computing unit, including the ring oscillators, could be measured with sufficient accuracy.

In some embodiments, the ring oscillator includes a chain of inverting elements forming a long ring and a short ring. The ring oscillator also includes an oscillation selection circuit that is configurable to disable the short ring so that the ring oscillator produces fundamental oscillation or to enable the short ring so that the ring oscillator produces a harmonic oscillation in addition to the fundamental oscillation. The ring oscillator also includes a frequency-monitoring tap that is connected to an output pad, a probe pad or a port of the IC. The chain of inverting elements includes at least one inverting element that is in both the short ring and the long ring and at least one inverting element that is in the long ring but not the short ring.

The period of the fundamental oscillation (denoted as $T_L$) is determined based on the propagation delay through the long ring. The period of the harmonic oscillation (denoted as $T_S$) is determined based on the propagation delay through the short ring. When the ring oscillator is configured to produce only fundamental oscillation without harmonic oscillation, it produces a first frequency (denoted as $F_1$). When the ring oscillator is configured to produce harmonic oscillation, it produces a second frequency (denoted as $F_2$).

Figure 2:
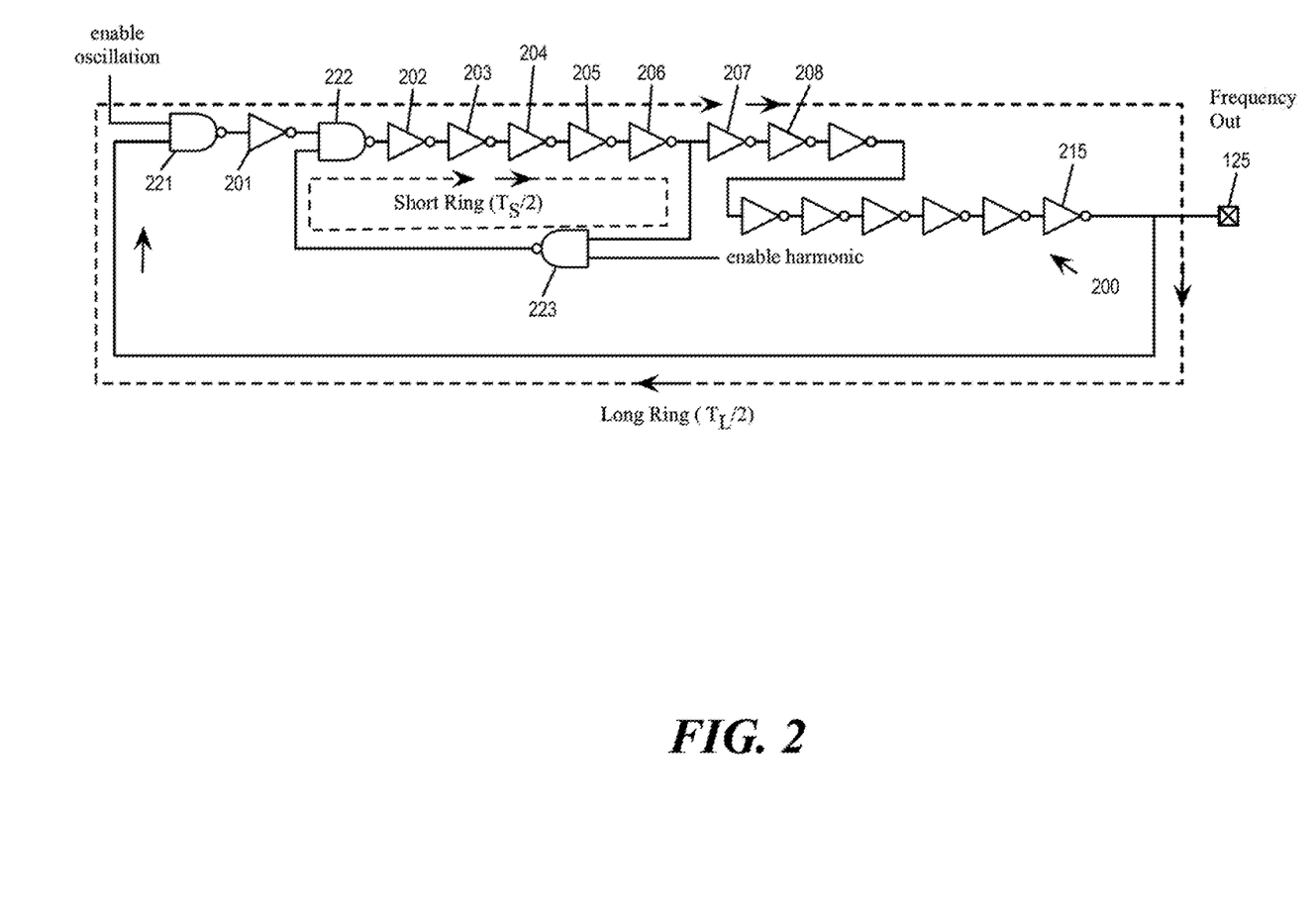
FIG. 2 illustrates a ring oscillator architecture having a long ring and a short ring, consistent with an exemplary embodiment.

Multiple architectures are possible for implementing the ring oscillator 110. FIG. 2 illustrates a ring oscillator architecture 200 having a long ring and a short ring, consistent with an exemplary embodiment. As illustrated, the ring oscillator architecture 200 has a chain of inverting elements. The chain of inverting elements includes NAND gates 221 and 222 as well as inverters 201-215. The output of the inverter 215 feeds back to the NAND gate 221, forming a long ring. The output of the inverter 206 feeds back to the NAND gate 222 through a harmonic enabling NAND gate 223, forming a short ring. Since odd number of inverting elements makes up the long ring (17), an oscillation would emerge as long as the ring oscillator has power and the NAND gate 221 allows the feedback signal from the inverter 215 to propagate. Likewise, since odd number of inverting elements make up the short ring (7), an oscillation would emerge as long as the ring oscillator has power and the NAND gate 223 allows the feedback signal from the inverter 206 to propagate through. (The NAND gate 223 is therefore the oscillation selection circuit.) The output of the inverter 215 serves as the frequency-monitoring tap that is connected to the output pad 125 ("frequency_out").

For some embodiments, a logic '0' at the enable oscillation signal of the NAND gate 221 completely disables oscillations in both rings so that the quiescent/standby current of the ring oscillator circuit may be monitored for other applications. For some other embodiments, the NAND gate 221 and the enable oscillation signal is omitted from the ring oscillator (and replaced by another inverting element such as an inverter).

When the enable oscillation signal of NAND gate 221 is a logic "1", the "enable harmonic" control signal at the input of the NAND gate 223 determines whether the ring oscillator produces the fundamental oscillation and/or the harmonic oscillation. When the control signal is at logic '0', the feedback from the inverter 206 is blocked and the short ring is an open loop. The oscillation is therefore entirely determined by the long ring and is referred to as the fundamental oscillation. The period of the fundamental oscillation $T_L$ is twice the propagation time through the long ring (i.e., NAND gates 221-222 and inverters 201-215).

On the other hand, when the "enable harmonic" control signal is at logic '1', the short ring is connected and the output of the inverter 206 is injected into long ring through the NAND gate 222. This introduces additional transitions (switching events) into the chain of inverting elements. The additional oscillation is referred to as harmonic oscillation. The period of the harmonic oscillation $T_S$ is twice the propagation time through the short ring (i.e., NAND gate 222, inverters 202-206, and NAND gate 223).

Figure 3:
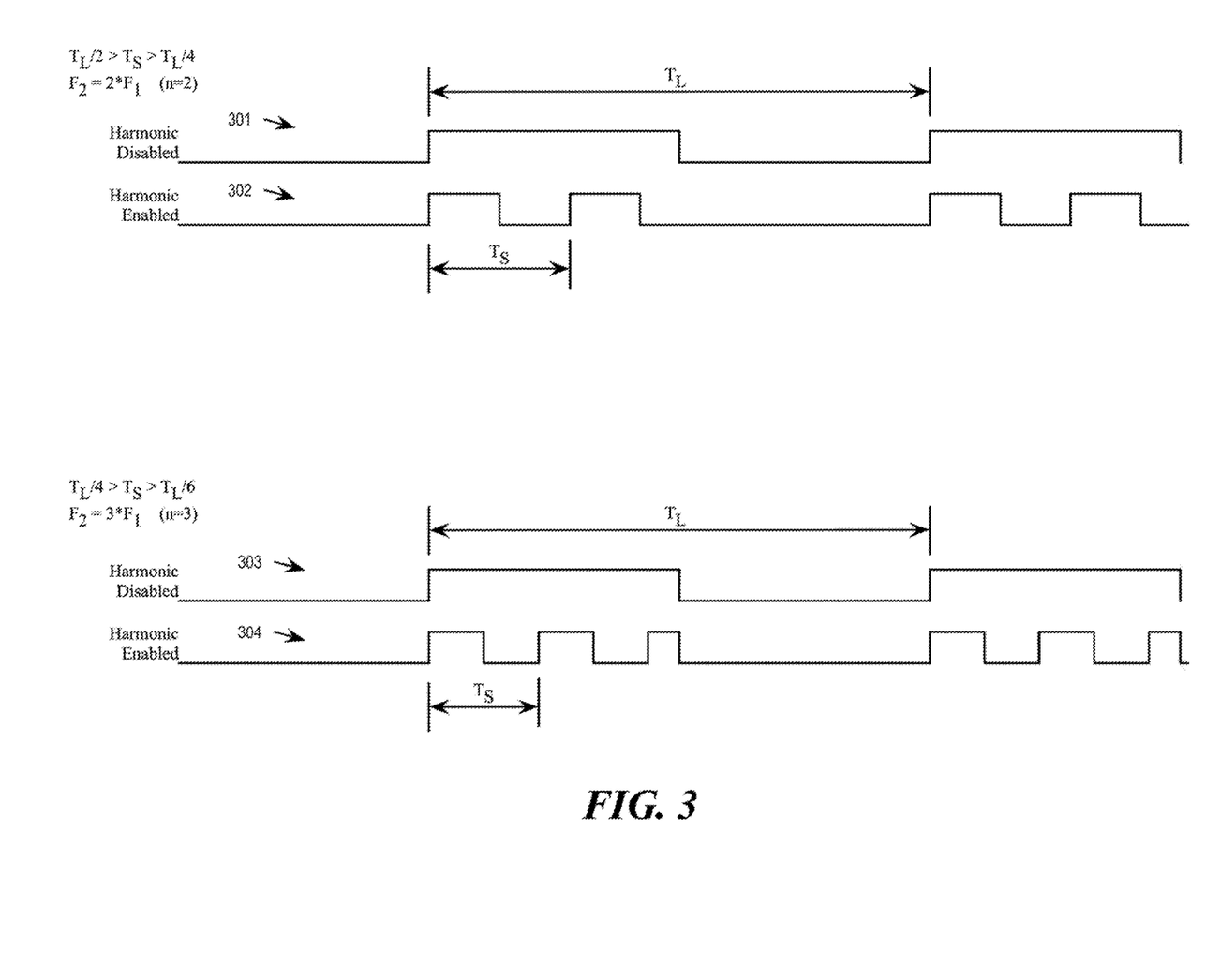
FIG. 3 illustrates example waveforms at the output of the ring oscillator, consistent with an exemplary embodiment.

FIG. 3 illustrates example waveforms at the output of the ring oscillator, consistent with an exemplary embodiment. The figures show, for the ring oscillator architecture 200, waveforms of the ring oscillator output for different values of $T_S$ (period of harmonic oscillation based on propagation through the short ring) relative to $T_L$ (period of fundamental oscillation based on propagation through the long ring). The figure shows 4 waveforms 301-304.

The waveforms 301-302 shows the output of a ring oscillator whose $T_S$ is between $T_L/2$ and $T_L/4$. The waveform 301 shows the output of the ring oscillator when the harmonic oscillation is disabled, i.e., when the output of the ring oscillator reflects only the fundamental oscillation. As illustrated, the period of the ring oscillator output is $T_L$, and the frequency of the ring oscillator is $F_1$, which correspond to one rising edge per $T_L$. The period $T_S$ of the oscillation in the short ring can be adjusted by changing the position where NAND 223 taps the signal from the inverter chain. For example, $T_S$ could be made shorter by tapping the signal at the output of inverter 204 or longer by tapping the signal at the output of inverter 208.

The waveform 302 shows the output of the ring oscillator when the harmonic oscillation is enabled or active. According to the ring oscillator architecture 200, the feedback signal of the short ring is allowed to enter the chain of inverting elements through the NAND gate 222 when the output of the ring oscillator is at logic '1'. Correspondingly, the harmonic oscillation is permitted to surface for only half of the $T_L$ period. In this case, only two rising edges of the harmonic oscillation are able to fit within $T_L/2$. Consequently, the frequency of the ring oscillator output $F_2$ (with harmonic oscillation) is expected to be $2*F_1$.

The wave form 303-304 shows the output of the ring oscillator whose $T_S$ is between $T_L/4$ and $T_L/6$. The waveform 303 shows the output of the ring oscillator when the harmonic oscillation is disabled. As illustrated, the period of the ring oscillator output is $T_L$, and the frequency of the ring oscillator output is $F_1$, which correspond to one rising edge per $T_L$.

The waveform 304 shows the output of the ring oscillator when the harmonic oscillation is enabled. Since only three rising edges of the harmonic oscillation are able to fit within $T_L/2$, the frequency of the ring oscillator output $F_2$ (with harmonic oscillation) is expected to be $3*F_1$.

To generalize, for a ring oscillator having the architecture 200 whose $T_S$ falls between $T_L/2(n-1)$ and $T_L/2n$, the frequency of the ring oscillator output $F_2$ is expected to be $n*F_1$, n being the expected integer multiple between the two different frequencies of the ring oscillator. The expected integer multiple is determined based on the relative lengths of $T_L$ and $T_S$, or length of $T_S$ relative to $T_L$.

Figure 4:
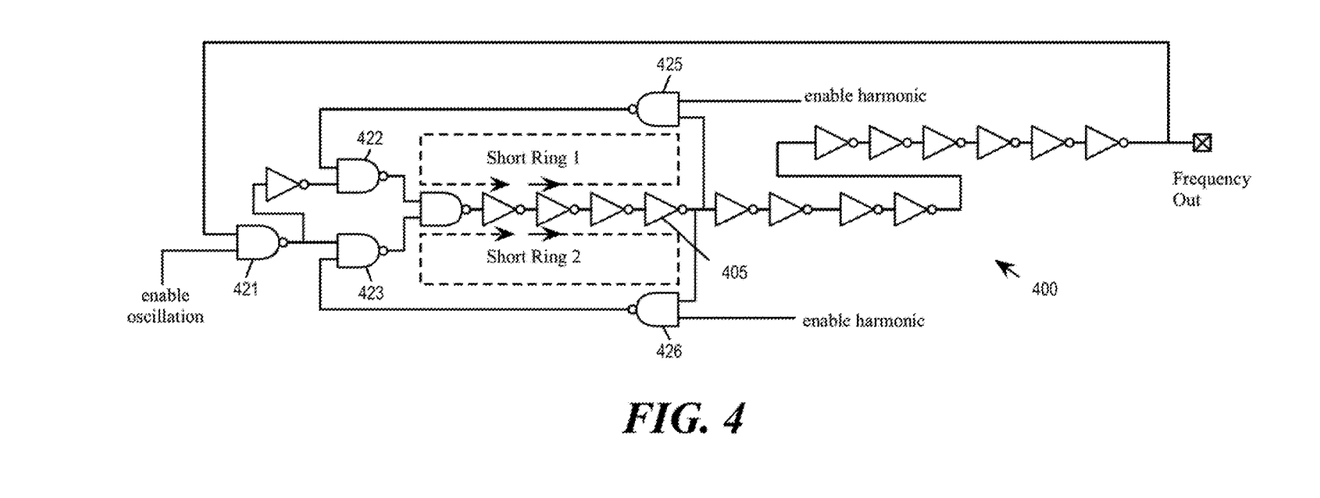
FIG. 4 illustrates alternative ring oscillator architecture in which the harmonic oscillation is allowed to appear for the entire period of the fundamental oscillation, consistent with an exemplary embodiment.

Under the ring oscillator architecture 200, the harmonic oscillation appears at the output of the ring oscillator for only half of the period of fundamental oscillation. FIG. 4 illustrates alternative ring oscillator architecture 400 in which the harmonic oscillation is allowed to appear for the entire period of the fundamental oscillation, consistent with an exemplary embodiment.

As illustrated, the ring oscillator architecture 400 has two short rings (short ring 1 and short ring 2) of inverting elements in addition to one long ring of inverting elements. This is unlike the ring oscillator architecture 200, which only has one short ring and one long ring. Both short rings of the architecture 400 are enabled by the "enable harmonic" control signal, which allows feedback of the first short ring to propagate through the NAND gate 425 and the feedback of the second short ring to propagate through the NAND gate 426. The feedback from the first short ring is injected into the long ring through the NAND gate 422 when the ring oscillator output is at logic '1', while the feedback from the second short ring is injected into the long ring through the NAND gate 423 when the ring oscillator output is at logic '0'.

The period of the harmonic oscillation based on the propagation delay of the first short ring is denoted as $T_{S1}$, while the period of the harmonic oscillation based on the propagation delay of the second short ring is denoted as $T_{S2}$. In the example illustrated in FIG. 4, both short rings taps the output of the inverter 405 as feedback and have similar propagation delays so that $T_{S1}$ is nearly identical to $T_{S2}$.

Having two rings that are active at different polarities of the ring oscillator output allows the harmonic oscillation to appear for the entire $T_L$ period, not just half. Thus, for a ring oscillator having the architecture 400 whose $T_{S1}$ and $T_{S2}$ are both between $T_L/2(n-1)$ and $T_L/2n$, its $F_2$ is expected to be $2n*F_1$. In other words, the expected integer multiple under architecture 400 is twice that of the architecture 200, given the same relative lengths of $T_L$ $T_{S1}$, and $T_{S2}$. In some embodiments, the propagation delay of the two short rings can be significantly different (i.e., $T_{S1} \neq T_{S2}$) because, for example, the first short ring taps a different inverter for feedback than the second short ring. This may allow more degree of freedom in adjusting $F_1$ and $F_2$.

Figure 5:
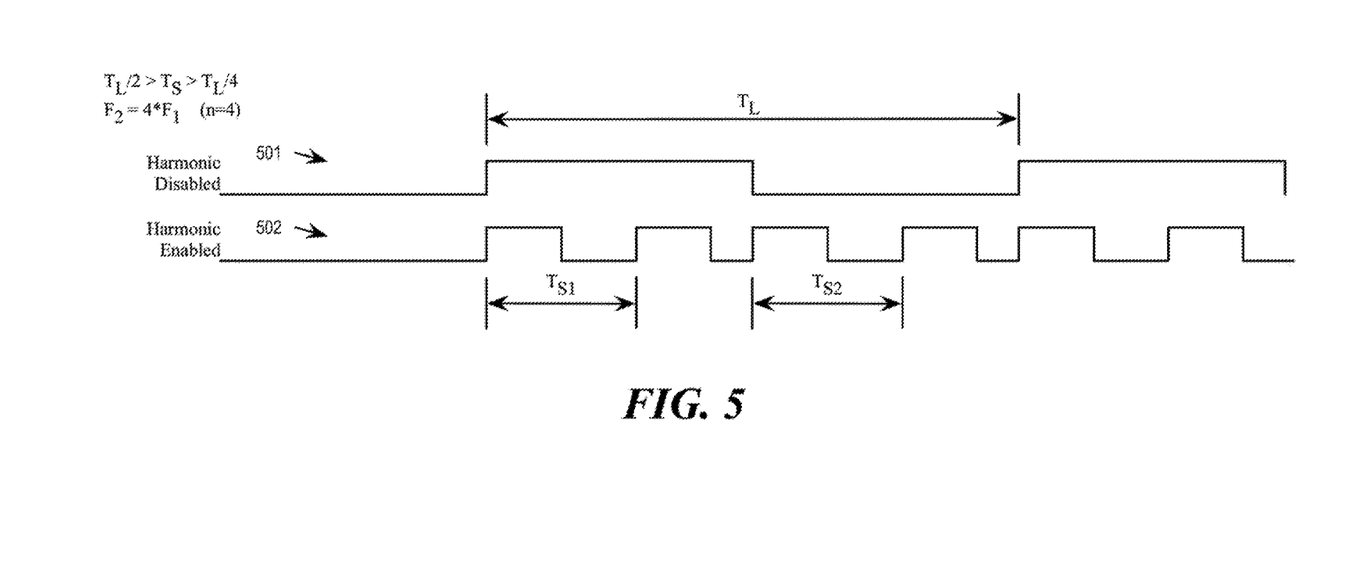
FIG. 5 illustrates example waveforms at the output of the alternative ring oscillator architecture.

FIG. 5 illustrates example waveforms at the output of the alternative ring oscillator architecture. The figure illustrates example waveforms 501-502 for a ring oscillator having architecture 400 whose $T_S$ falls between $T_L/2$ and $T_L/4$.

The waveform 501 shows the output of the ring oscillator when the harmonic oscillation is disabled, i.e., when the output of the ring oscillator reflects only the fundamental oscillation. The period of the ring oscillator output is $T_L$, and the frequency of the ring oscillator is $F_1$, which correspond to one rising edge per $T_L$.

The waveform 502 shows the output of the ring oscillator when the harmonic oscillation is enabled. According to the ring oscillator architecture 400, the harmonic oscillation is permitted to surface for both halves of the $T_L$ period. In this case, four rising edges are able to fit within one $T_L$. Consequently, the frequency of the ring oscillator output $F_2$ is expected to be $4*F_1$.

The waveforms illustrated in FIGS. 3 and 5 assumes that the local voltage of the ring oscillator remains constant regardless of the oscillation frequency produced by the ring oscillator. However, as mentioned earlier, the conductors bringing power to the ring oscillator have wire resistance (e.g., 135). The wire resistance causes a voltage drop when the ring oscillator draws current flow through the power supply conductor. Since the ring oscillator draws different amounts of current at different frequencies, the voltage drop across the wire resistance is also different at different frequencies. This difference in voltage drop causes the local voltage at the ring oscillator to be different at different frequencies.

As mentioned, $F_2$ (the ring oscillator frequency with harmonic oscillation) is expected to be an integer multiple of $F_1$ (ring oscillator frequency with only fundamental oscillation) at constant ring oscillator voltage, but the IR drop in the power supply wiring reduces $F_2$ in proportion to the current drawn by the ring oscillator. In other words, $F_2 < mF_1$, m being the expected integer multiple that is determined based on the length of $T_S$ relative to $T_L$ as well as based on the architecture of the ring oscillator. The difference in frequencies, $\Delta F = F_2 - mF_1$, is attributable to the presence of the voltage drop across the power supply wire resistance. (The difference in frequencies can also be computed as $\Delta F = F_2/m - F_1$.) Some embodiments of the disclosure provide a method for determining the wire resistance and the local voltage based on $\Delta F$.

The frequency F of the ring oscillator is a function of the local voltage V of the ring oscillator. Accordingly, the change in frequency is provided in equation 1 below:

$$\Delta F = (dF/dV) * \Delta V \qquad \text{Eq. (1)}$$

Where: $\Delta V$ is a change in local voltage that corresponds to the difference between $F_2$ and $mF_1$.

According to Eq. (1), a tester implementing the method can determine the value of $\Delta V$ by measuring $F_2$, $F_1$, and $dF/dV$. The tester can determine the value of $dF/dV$ by varying the applied voltage to the IC in a small range around the nominal test voltage and measuring the corresponding frequencies produced by the ring oscillator around the fundamental frequency $F_1$. Furthermore, $$\Delta V = R * (i_2 - i_1) \qquad \text{Eq. (2)}$$

Where:
R is the wire resistance of the power supply to the ring oscillator,
$i_1$ is the measured current when the ring oscillator has its harmonic oscillation disabled, and
$i_2$ is the measured current when the ring oscillator has its harmonic oscillation enabled.

With the value of $\Delta V$ determined by Eq. (1) and values of i1 and i2 measured, the tester can compute the value of R, or specifically, $$R = \Delta F / (dF/dV) / (i_2 - i_1) \qquad \text{Eq. (3)}$$

The local voltage $V_{local}$ of the ring oscillator can then be computed from the applied voltage $V_{applied}$ of the IC, the computed value of wire resistance R, and a current value i:

$$V_{local} = V_{applied} - i * R \qquad \text{Eq. (4)}$$

The tester may determine $V_{local}$ for when the harmonic oscillation is disabled (by using the $i_1$) or for when the harmonic oscillation is enabled (by using $i_2$) by using Eq. (4).

It is worth noting that determining $V_{local}$ at a ring oscillator by measuring frequencies and current values does not require using an output pad to directly monitor the local voltage of the ring oscillator. Rather, it only requires observation of the output of the ring oscillator (i.e., "frequency out"). Furthermore, since the ring oscillator output is a digital signal, it can be relayed by other digital logic circuits. The outputs of multiple ring oscillators can also be logically merged (e.g., by an OR gate, a wired-OR, a multiplexer, etc.) so that a tester can use a minimal set of output pads (e.g., one) to measure the frequencies of the ring oscillators and to determine their local voltages.

Figure 6:
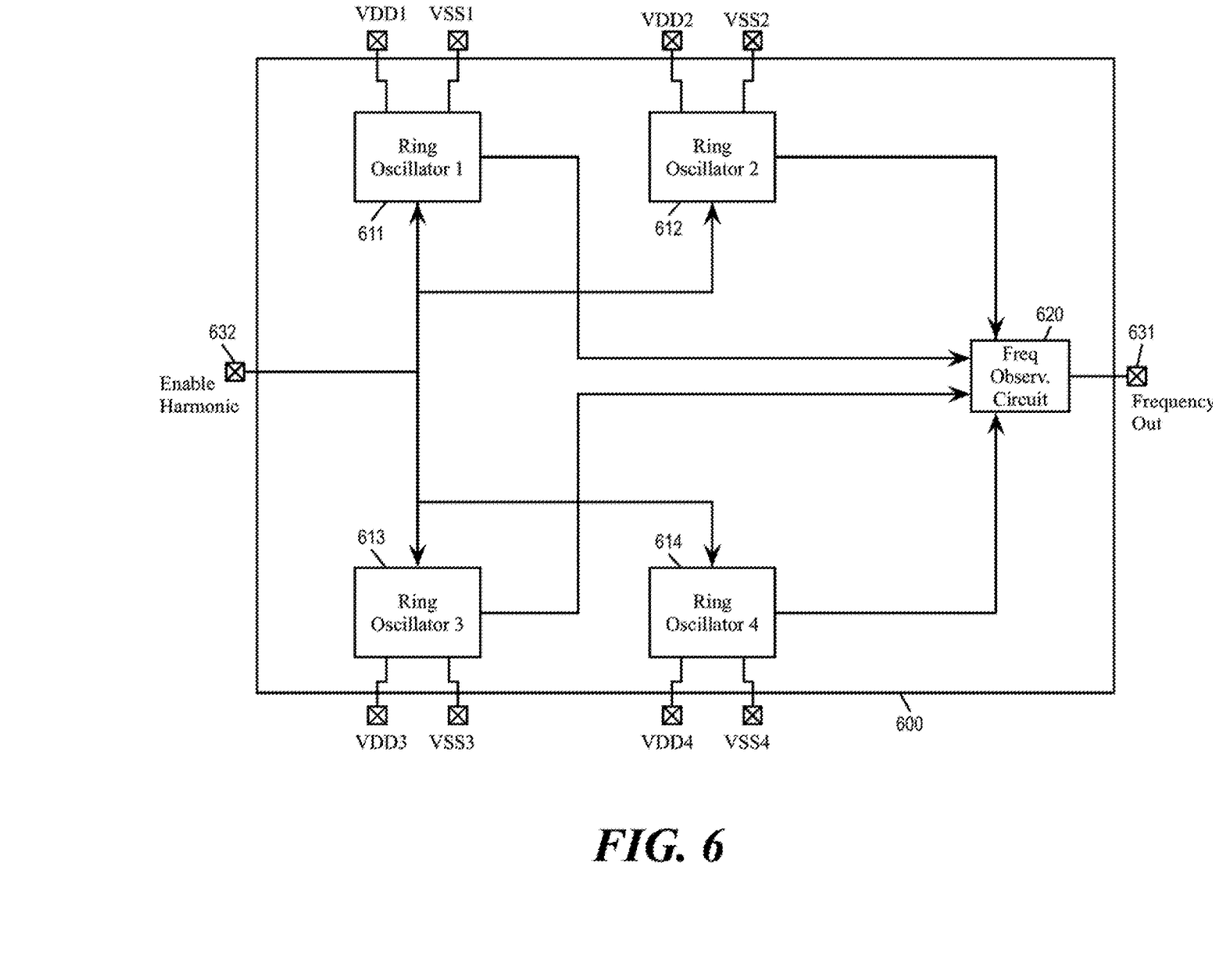
FIG. 6 illustrates an IC with multiple ring oscillators whose local voltages can be determined by frequency and current measurement, consistent with an exemplary embodiment.

FIG. 6 illustrates an IC 600 with multiple ring oscillators whose local voltages can be determined by frequency and current measurement, consistent with an exemplary embodiment. The frequency measurement of the different ring oscillators can be measured from a common output pad. As illustrated, the IC 600 has at least four ring oscillators 611-614 that are situated at different locations within the IC. Each of these ring oscillators is similar to the oscillator 110. These ring oscillators are powered by different sets of power supply pads, and each set of power pad provides power to a respective ring oscillator (VDD1 and VSS1 for the ring oscillator 611, VDD2 and VSS2 for the ring oscillator 612, VDD3 and VSS3 for the ring oscillator 613, VDD4 and VSS4 for the ring oscillator 614). In some embodiments, each ring oscillator has its own set of VDD power supply pads while sharing VSS supply pads with other ring oscillators.

One single "enable harmonic" control signal from an input pad 632 enables or disables the harmonic oscillation in all four ring oscillators 611-614.

The frequency outputs of the ring oscillators 611-614 are collected by a frequency observation circuit 620, which in turn reports the frequency of one of the ring oscillators. In some embodiments, the frequency observation circuit 620 is simply a circuit that logically ORs the frequency outputs of the ring oscillators 611-614. In some embodiment, the frequency observation circuit 620 includes a counter/divider that is used to reduce the reported frequency to a more manageable value. The output of the frequency observation circuit 620 is connected to an output pad 631 ("frequency out") of the IC 600. In some embodiments, an output buffer (not illustrated) may also be used to drive the reported frequency signal at the output pad 631. Since the ring oscillators 611-614 are powered by different sets of power supply pads, a ring oscillator can be individually powered on to produce oscillation while other ring oscillators are powered off. This allows the frequency of each ring oscillators to be individually measured at the same output pad 631. In some embodiments, the reported frequency would not go to a dedicated pad such as in the pad 631, but would be measured on-chip using a frequency measurement unit.

Figure 7:
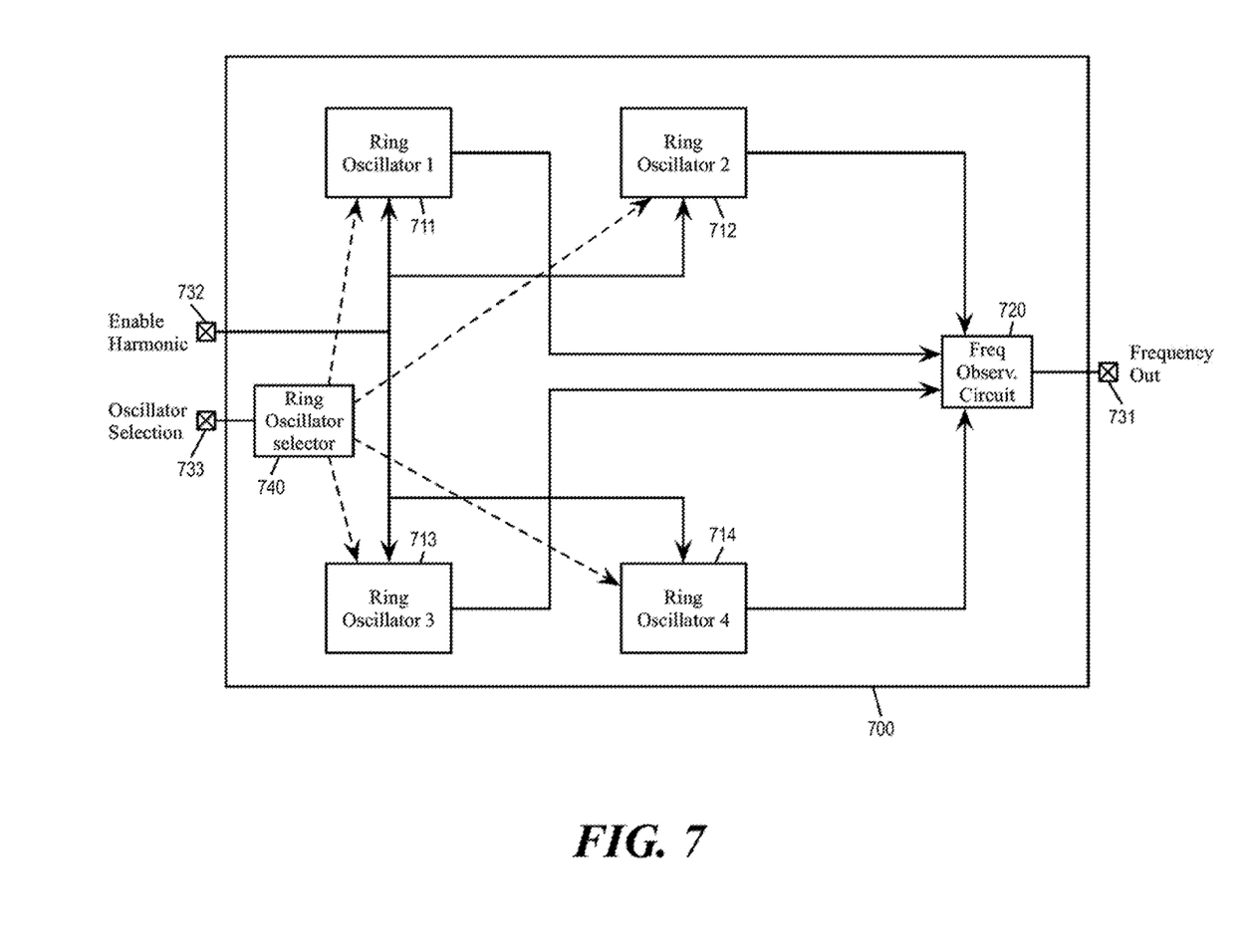
FIG. 7 illustrates an IC with multiple ring oscillators whose local voltages can be determined by frequency and current measurement, consistent with an exemplary embodiment.

FIG. 7 illustrates an IC 700 with multiple ring oscillators whose local voltages can be determined by frequency and current measurement, consistent with an exemplary embodiment. Like the IC 600, the IC 700 has at least four ring oscillators 711-714 that are situated at different locations within the IC, and the frequencies of the different ring oscillators can be measured from a common output pad 731 ("frequency out"). In the example of FIG. 7, a single enable harmonic control signal from an input pad 732 enables or disables the harmonic oscillation in all four ring oscillators 711-714.

However, unlike the IC 600, the four ring oscillators 711-714 may share some power supplies pads (not illustrated) so they cannot be individually enabled or disabled by being powered-up or powered-down. Instead, each ring oscillator has its own oscillation enable signal that is controlled by a ring oscillator selector circuit 740. The ring oscillator selector receives an input value from a set of input pads 733 and selects one ring oscillator to enable oscillation while disabling oscillation in other, unselected ring oscillators. The ring oscillators can therefore be individually enabled or disabled. The frequency outputs of the ring oscillators are reported to a frequency observation circuit 720 (similar to the frequency observation unit 620), which allows the frequency of each ring oscillator to be measured at the same output pad 731 or measured on chip using a frequency measurement unit.

One skilled in the art would understand that FIGS. 6 and 7 are but two possible examples of an IC that allows using one IC output pad to measure the frequencies of multiple ring oscillators in the IC.

Figure 8:
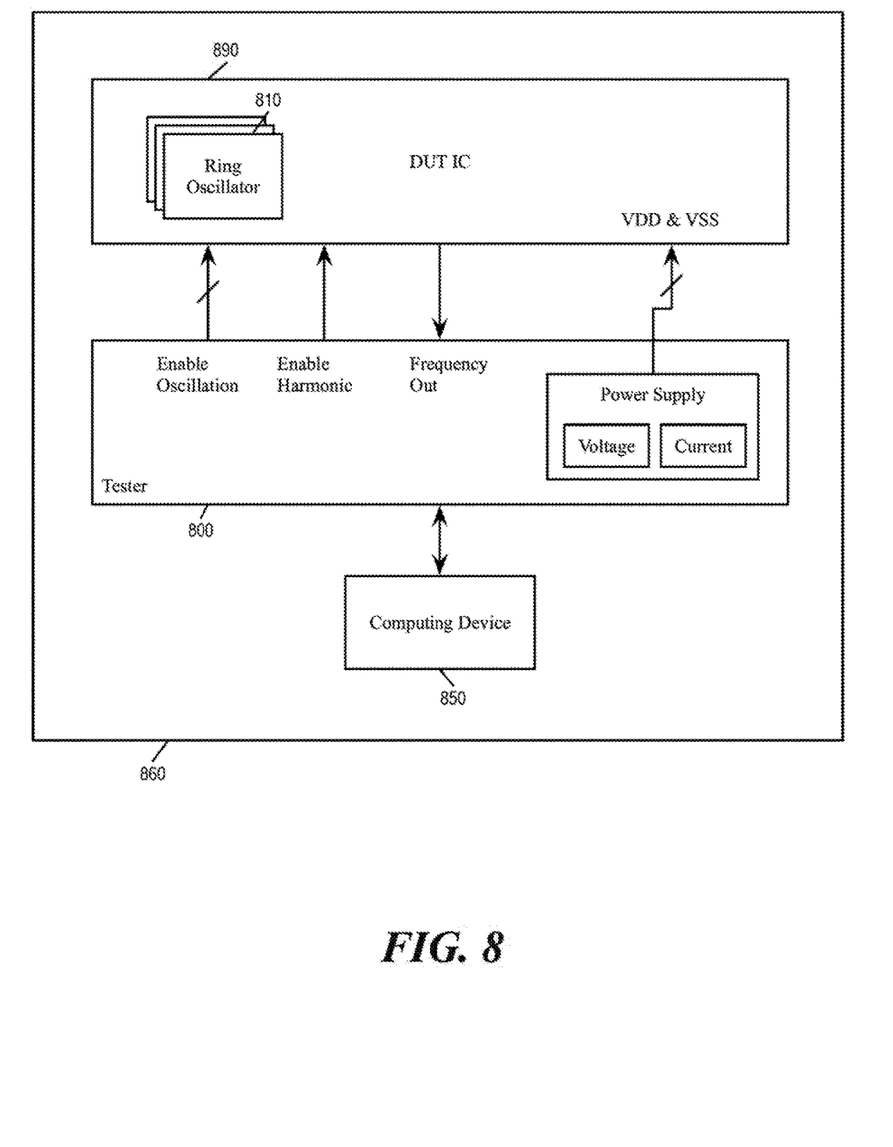
FIG. 8 illustrates an example tester for determining the local voltage(s) of ring oscillator(s) in an IC.

FIG. 8 illustrates an example tester 800 for determining the local voltage(s) of ring oscillator(s) in an IC 890. The IC 890 is similar to the IC 600 or 700 and has one or more ring oscillators 810 that are similar to the ring oscillator 110. The IC 890 is connected to the tester 800 as a device under test (DUT) via input pads and output pads of the IC.

As illustrated, the tester 800 provides power connections to the IC 890 through VDD and VSS pads. The tester 800 is configured to measure the applied voltage and the current into the IC through the power connections. In some embodiments, the tester can selectively turn on and off some of the power connections in order to selectively enable and disable ring oscillators.

The tester 800 also provides control signals to the IC 890, control signals such as the "enable oscillation" and "enable harmonic" signals for enabling fundamental oscillation and/or harmonic oscillation in the ring oscillators 810. The tester 800 also receives the "frequency output" from the IC 890 so it can measure the frequency of the oscillation in the ring oscillators 810.

A computing device 850 controls the operations of the tester 800. In some embodiments, the tester 800 and the computing device 850 are parts of a same electronic apparatus 860. The computing device has one or more processing units (e.g., a processor) that control the operations of the tester 800.

Figure 9:
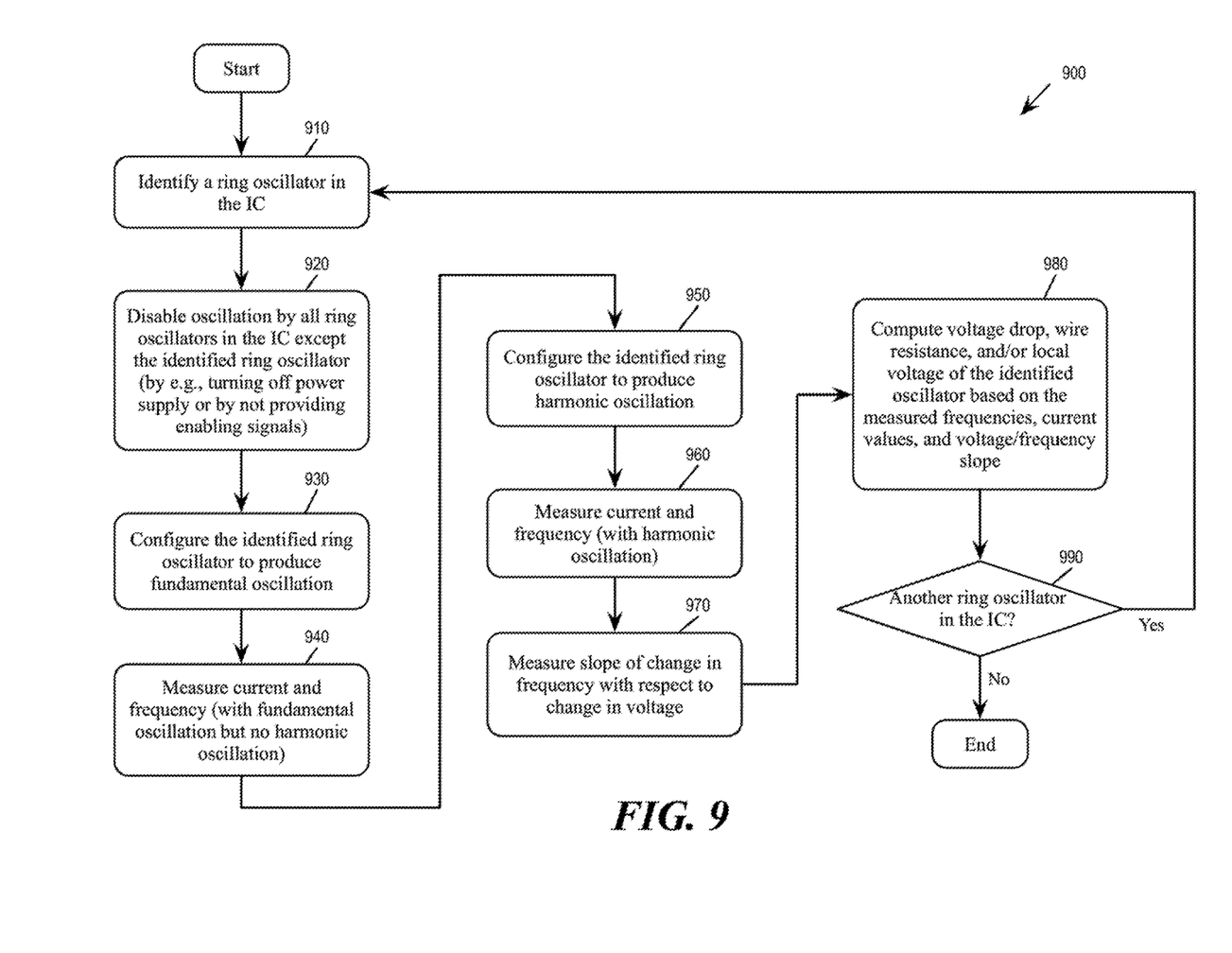
FIG. 9 conceptually illustrates a process for determining the local voltages of the ring oscillators in an IC, consistent with an exemplary embodiment.

FIG. 9 conceptually illustrates a process 900 for determining the local voltages of the ring oscillators in an IC, consistent with an exemplary embodiment. In some embodiments, one or more processing units (e.g., processor) of a computing device perform the process 900 when it is instructing an IC tester to test an IC with ring oscillators (e.g., the computing device 850 controlling the tester 800 to test the IC 890).

The computing device starts the process 900 by identifying (at 910) or selecting a ring oscillator in the IC. The computing device disables (at 920) the oscillation of all ring oscillators in the IC except for the identified ring oscillator. This can be done by e.g., turning off the power supply to all ring oscillators except the identified ring oscillator, or by asserting an enable oscillation control signal to the identified oscillator while de-asserting the enable oscillation control signal to other ring oscillators. The selection of a ring oscillator in an IC is described by reference to FIGS. 6 and 7 above.

The computing device configures (at 930) the identified ring oscillator to produce fundamental oscillation, specifically by disabling harmonic oscillation (e.g., by de-asserting the "enable harmonic" signal. The computing device then measures (at 940) the current being drawn by the IC as well as the frequency produced by the ring oscillator. The measured frequency ($F_1$) is the frequency of the ring oscillator and the measured current ($i_1$) is the current drawn by the IC when the identified ring oscillator has only the fundamental oscillation without harmonic oscillation.

The computing device configures (at 950) the identified ring oscillator to produce harmonic oscillation (e.g. by asserting the "enable harmonic" signal.). The computing device then measures (at 960) the current being drawn by the IC as well as the frequency produced by the ring oscillator. The measured frequency ($F_2$) is the frequency of the ring oscillator and the measured current ($i_2$) is the current drawn by the IC when the identified ring oscillator is oscillating with the harmonic oscillation.

The computing device also measures (at 970) the slope of change in ring oscillator frequency F with respect to change in ring oscillator local voltage V (i.e., dF/dV or the derivative of F with respect to V.) In some embodiments, this is done by controlling the tester to vary the applied voltage to the IC and by measuring the corresponding frequencies produced by the ring oscillator. The computing device then computes (at 980) the voltage drop, the wire resistance, and the local voltage of the identified oscillator based on the measured frequencies, the measured current values, and the measured frequency/voltage slope. For some embodiments, these values are calculated according to Eq. (1), (2), (3), and (4) described above.

At 990, the computing device determines whether there is another ring oscillator in the IC for which it is necessary to determine the local voltage. If so, the process returns to 910 to enable fundamental and harmonic oscillations in another ring oscillator and to measure frequency and current values from the IC. If there is no other ring oscillator in the IC for which it is necessary to determine the local voltage, the process 900 ends.

Example Electronic System

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 9) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
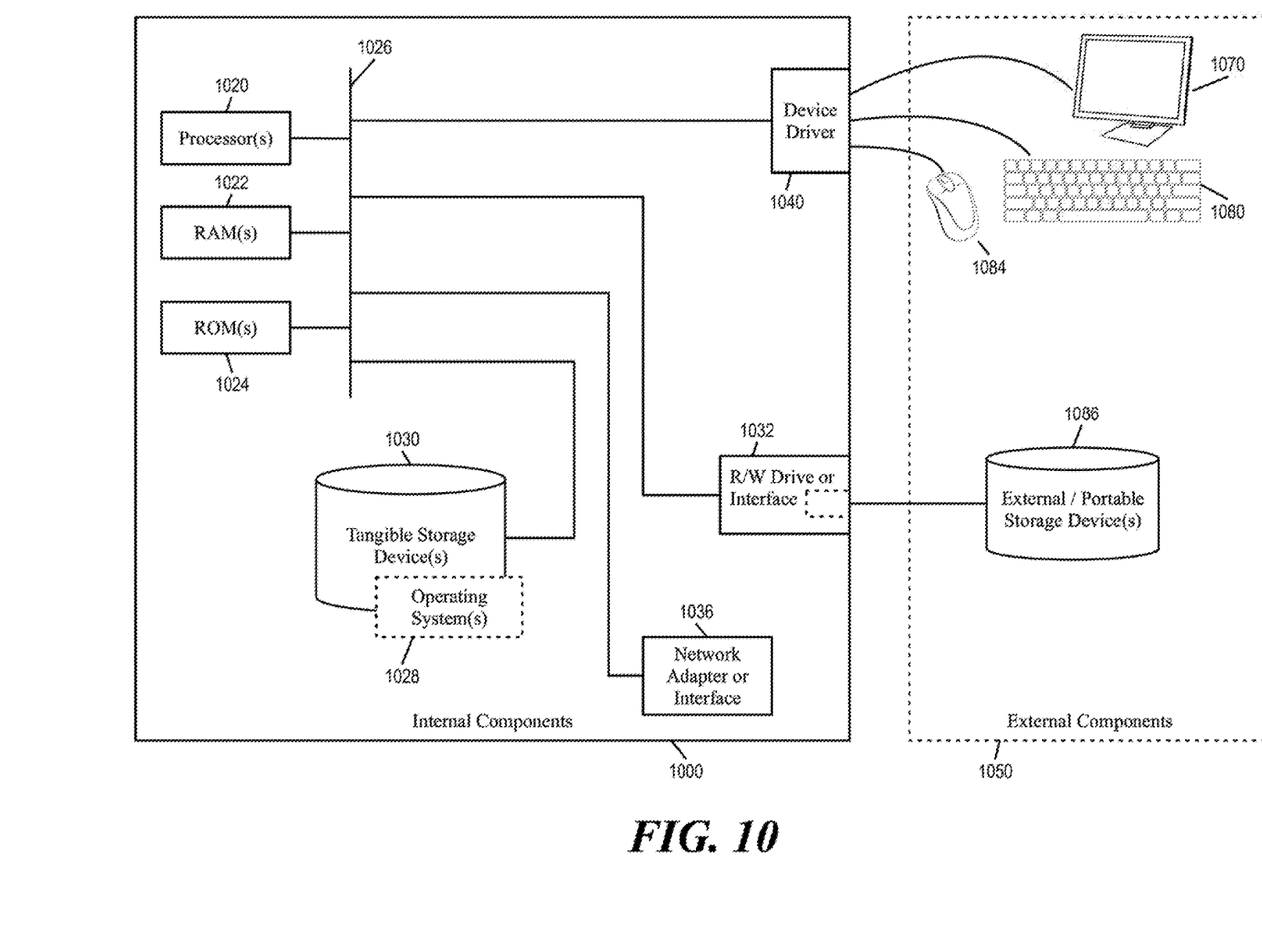
FIG. 10 shows a block diagram of the components of a data processing system in accordance with an illustrative embodiment of the present disclosure.

FIG. 10 shows a block diagram of the components of data processing systems 1000 and 1050 that may be used to implement an IC testing device for measuring local voltages of ring oscillators (e.g., the computing device 850 that controls the tester 800) in accordance with an illustrative embodiment of the present disclosure. It should be appreciated that FIG. 10 provides only an illustration of one implementation and does not imply any limitations with regard to the environments in which different embodiments may be implemented. Many modifications to the depicted environments may be made based on design and implementation requirements.

Data processing systems 1000 and 1050 are representative of any electronic device capable of executing machine-readable program instructions. Data processing systems 1000 and 1050 may be representative of a smart phone, a computer system, PDA, or other electronic devices. Examples of computing systems, environments, and/or configurations that may represented by data processing systems 1000 and 1050 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 1000 and 1050 may include a set of internal components 1000 and a set of external components 1050 illustrated in FIG. 10. The set of internal components 1000 includes one or more processors 1020, one or more computer-readable RAMs 1022 and one or more computer-readable ROMs 1024 on one or more buses 1026, and one or more operating systems 1028 and one or more computer-readable tangible storage devices 1030. The one or more operating systems 1028 and programs such as the programs for executing the process 900 are stored on one or more computer-readable tangible storage devices 1030 for execution by one or more processors 1020 via one or more RAMs 1022 (which typically include cache memory). In the embodiment illustrated in FIG. 10, each of the computer-readable tangible storage devices 1030 is a magnetic disk storage device of an internal hard drive. Alternatively, each of the computer-readable tangible storage devices 1030 is a semiconductor storage device such as ROM 1024, EPROM, flash memory or any other computer-readable tangible storage device that can store a computer program and digital information.

The set of internal components 1000 also includes a R/W drive or interface 1032 to read from and write to one or more portable computer-readable tangible storage devices 1086 such as a CD-ROM, DVD, memory stick, magnetic tape, magnetic disk, optical disk or semiconductor storage device. The instructions for executing the process 900 can be stored on one or more of the respective portable computer-readable tangible storage devices 1086, read via the respective R/W drive or interface 1032 and loaded into the respective hard drive 1030.

The set of internal components 1000 may also include network adapters (or switch port cards) or interfaces 1036 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 1036. From the network adapters (or switch port adaptors) or interfaces 1036, the instructions and data of the described programs or processes are loaded into the respective hard drive 1030. The network may comprise copper wires, optical fibers, wireless transmission, routers, firewalls, switches, gateway computers and/or edge servers.

The set of external components 1050 can include a computer display monitor 1070, a keyboard 1080, and a computer mouse 1084. The set of external components 1050 can also include touch screens, virtual keyboards, touch pads, pointing devices, and other human interface devices. The set of internal components 1000 also includes device drivers 1040 to interface to computer display monitor 1070, keyboard 1080 and computer mouse 1084. The device drivers 1040, R/W drive or interface 1032 and network adapter or interface 1036 comprise hardware and software (stored in storage device 1030 and/or ROM 1024).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An integrated circuit (IC) comprising:
    a ring oscillator comprising:
        a chain of inverting elements forming a long ring and a short ring;
        an oscillation selection circuit configured to:
            (i) disable the short ring so that the ring oscillator produces a fundamental oscillation based on a signal propagation through the long ring; and
            (ii) enable the short ring so that the ring oscillator produces a harmonic oscillation based on the signal propagation through the short ring and the long ring; and
        a frequency output pad connected to an output of the ring oscillator.

2. The IC of claim 1, wherein the ring oscillator produces a first frequency $F_1$ that is determined based on a period $T_L$ of the fundamental oscillation when the short ring is disabled and a second frequency $F_2$ that is determined based on a period $T_S$ of the harmonic oscillation when the short ring is enabled.

3. The IC of claim 2,
    wherein the period $T_L$ is based on a length of time for a signal to propagate through the inverting elements of the long ring, and
    wherein $T_S$ is based on a length of time for a signal to propagate through the inverting elements of the short ring.

4. The IC of claim 2, wherein the harmonic oscillation is enabled for half of the period $T_L$ and disabled for half of the period $T_L$.

5. The IC of claim 2,
    wherein $F_2 < nF_1$ and $2 \times (n-1) \times T_S < T_L < 2n \times T_S$, and
    wherein n is an integer multiple that is determined based on a length of $T_S$ relative to $T_L$.

6. The IC of claim 1,
    wherein the short ring is a first short ring,
    wherein the ring oscillator further comprises a second short ring, and
    wherein the oscillation selection circuit is configured to enable and disable the first and second short rings.

7. The IC of claim 6, wherein the harmonic oscillation is active for the entire period $T_L$.

8. The IC of claim 1, wherein the chain of inverting elements comprises at least one of inverters and NAND gates.

9. The IC of claim 1, wherein the chain of inverting elements comprises (i) at least one inverting element that is in both the short ring and the long ring and (ii) at least one inverting element that is in the long ring but not the short ring.

10. An electronic apparatus for testing an integrated circuit (IC) that comprises a ring oscillator, wherein the electronic apparatus is configured to perform acts comprising:
    configuring the ring oscillator to produce oscillation at a first frequency;
    configuring the ring oscillator to produce oscillation at a second frequency; and
    comparing the second frequency with an integer multiple of the first frequency to determine a resistive voltage drop between a voltage applied to the IC and a local voltage at the ring oscillator, wherein the electronic apparatus is further configured to perform the act comprising determining a change in the local voltage that corresponds to a difference between the second frequency and the integer multiple of the first frequency.

11. The electronic apparatus of claim 10, wherein the ring oscillator comprises a long ring and a short ring.

12. The electronic apparatus of claim 11,
    wherein configuring the ring oscillator to produce oscillation at the first frequency comprises disabling the short ring, and
    wherein configuring the ring oscillator to produce oscillation at the second frequency comprises enabling the short ring.

13. The electronic apparatus of claim 10, wherein the electronic apparatus is further configured to perform the acts comprising:
    measuring a first current value of the IC when the ring oscillator is configured to produce oscillation at the first frequency;
    measuring a second current value of the IC when the ring oscillator is configured produce oscillation at the second frequency; and
    computing a resistance value based on the change in the local voltage and a difference between the first and second current values.

14. The electronic apparatus of claim 13, wherein the electronic apparatus is further configured to perform the acts comprising determining the local voltage of the ring oscillator based on the voltage applied to the IC, the identified resistance value, and a current value.

15. An integrated circuit (IC) comprising:
a plurality of ring oscillators, each ring oscillator configured to produce oscillations at one of a first frequency and a second frequency;
an input pad configured to provide a control signal to the plurality of ring oscillators to select one of the first frequency and the second frequency; and
an output pad configured to monitor oscillations of the plurality of ring oscillators wherein each ring oscillator comprises a long ring and a short ring.

16. The IC of claim 15, wherein each ring oscillator is configured to produce oscillation at the first frequency when the short ring is disabled and at the second frequency when the short ring is enabled.

17. The IC of claim 15, further comprising a plurality of sets of power pads, wherein each set of power pad provides power to a respective ring oscillator.

18. The IC of claim 15, further comprising a selection circuit configured to enable one selected ring oscillator and to disable the non-selected ring oscillators.

* * * * *